United States Patent
Beneze

[15] 3,645,655
[45] Feb. 29, 1972

[54] MOLD FOR CASTING TIRES
[72] Inventor: Heinz Wilhelm Beneze, Akron, Ohio
[73] Assignee: The Firestone Tire & Rubber Company, Akron, Ohio
[22] Filed: Apr. 14, 1969
[21] Appl. No.: 815,879

[52] U.S. Cl. ............................... 425/35, 425/49, 425/395, 425/426, 249/183, 264/311
[51] Int. Cl. ..................... B29c 5/00, B29f 1/00, B29h 17/00
[58] Field of Search ..................... 18/17 K, 18 C, 45 T, 42 T, 18/26 RR, 42 D; 25/128 D; 249/150, 151, 152, 153, 183

[56] References Cited

UNITED STATES PATENTS

| | | | |
|---|---|---|---|
| 1,179,898 | 4/1916 | Coffey et al. | 18/17 K |
| 1,388,255 | 8/1921 | Hardeman | 18/17 K |
| 2,904,842 | 9/1959 | Alm | 18/18 C X |
| 3,261,240 | 7/1966 | Herman et al. | 18/18 C X |
| 3,486,198 | 12/1969 | Lewis | 18/42 T |
| 3,492,180 | 1/1970 | Smith | 18/42 T X |
| 2,261,247 | 11/1941 | Girard | 749/183 X |
| 2,315,634 | 4/1943 | McCall | 249/150 X |

FOREIGN PATENTS OR APPLICATIONS 1,489,168   6/1967   France ................................. 18/42 T Primary Examiner—J. Howard Flint, Jr.
Attorney—S. M. Clark and Gordon B. Seward

[57] ABSTRACT

A mold for the centrifugal casting of vehicle tires comprising a separable outer mold part having an inner surface which defines the outer shape of a tire and which will hold an annular tread design insert which has the design of the tire tread on its inner surface and which may also extend around the outside surface of the to be formed tire down to the bead area. Positioned within the confines of the outer mold part is a ringlike elastic core member which has an outer surface which defines the inner surface of a tire when the elastic core member is held in extended position. The elastic core member has an inner surface which permits it to be collapsed and removed from the finished tire. A plurality of form members are located in the inner surface of the elastic core member to hold the core member in extended position. The form members are located in end-to-end relationship to each other and form a generally ringlike shape with each form comprising a sector of the ring. A cylindrical support holds the form members in position and when removed permits removal of the form members from the elastic core member in a generally radially inwardly direction. Means are provided for rotating the mold and also for introducing a flowable and curable elastomeric material into the space between the outer mold part and the elastic core member.

4 Claims, 6 Drawing Figures

PATENTED FEB 29 1972 3,645,655

MOLD FOR CASTING TIRES

Automotive tire molds are usually constructed of steel or aluminum and the tread profile is engraved or inserted into the material of the mold. Rotating type molds are similarly constructed, however, instead of using a conventional bladder, a multipiece steel or aluminum core forms the inside profile of the tire. Material and labor costs for these molds are quite high.

The present invention solves the above disadvantages in that the tread design is produced in an elastic insert which is placed in the outer mold part. This insert may be mass produced for example by injection molding and only one expensive mold need be initially produced, namely, the one used in the injection molding machine. In addition, the previously expensive core has been replaced by an elastic annular ring or bag member which is held in place by relatively rigid form members. These form members may be readily removed after the tire is formed and the ring or bag member may be easily distorted or collapsed and removed from the completed tire. The elastic insert with the tread design thereon and can be easily removed from the tread of the tire and reused.

Other objects and a fuller understanding of this invention may be had by referring to the following description and claims, taken in conjunction with the accompanying drawings, in which:

Figure 1:
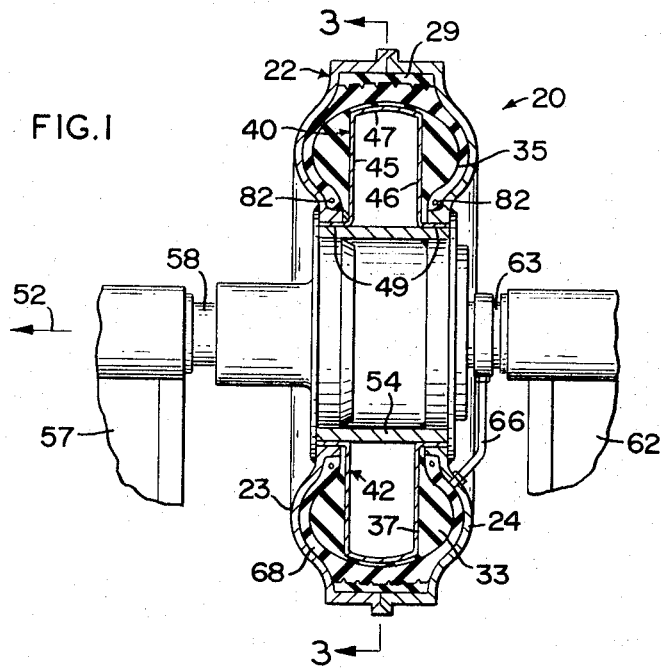
FIG. 1 is an elevational view partially in section showing the mold of the present invention with a completed tire therein.
Figure 3:
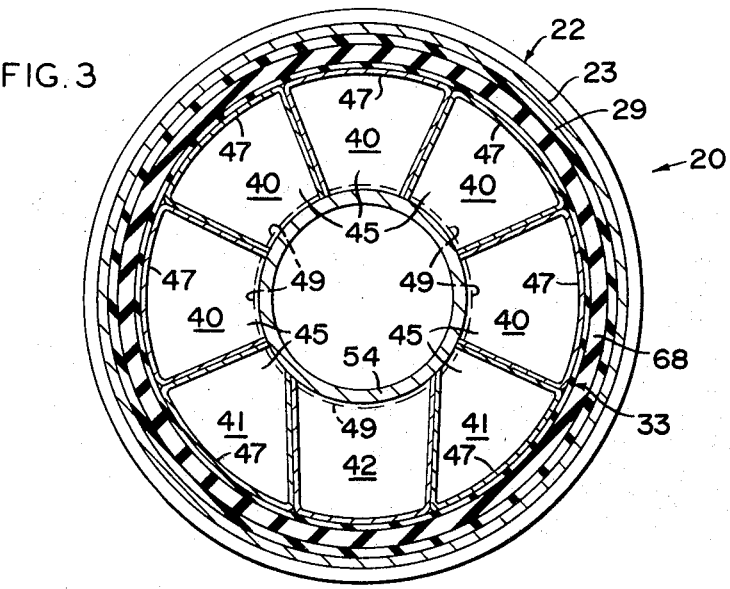
FIG. 3 is a view taken generally along the line 3—3 of FIG. 1.

The mold of the present invention is shown in the completely assembled condition in FIGS. 1 and 3 of the drawings and is indicated generally by the reference numeral 20. The mold includes an outer mold part 22 which has first and second axially separable halves 23 and 24, respectively. The first mold half 23 is secured to a shaft 58 which in turn is rotatably carried by a support 57. The support 57 is carried by structure which enables the support to be moved back and forth as indicated by the arrow 52, however, this additional mechanism has not been shown because it forms no part of the present invention. The second mold half 24 is, in a like manner, carried by a shaft 63 which is rotatably carried on a support 62. Suitable mechanism is provided for imparting rotational movement to the shafts 58 and 63 so as to rotate the mold 20 in the manner required for centrifugal casting. The two mold halves may be appropriately held together in assembled condition by bolts extending through mating flanges or other suitable means, none of which have been shown. The mold need not be rotatably supported at both ends as shown but might be supported only at one end.

The outer mold part 22 is provided with an inner surface 27 which is constructed so as to form the outer shape or configuration of a vehicle tire and this inner surface also is constructed so as to provide a chamber or cavity for receiving what will be referred to as a tread design insert 29. The mold halves 23 and 24 are relatively inexpensively constructed in that they can be press formed or the advanced metal spinning technique can be used to effect their manufacture. The tread design insert 29 is preferably constructed of an elastomeric material and is injection molded to facilitate mass production. The tread profile is formed on the inner peripheral surface of the tread design insert 29 and all that need initially be done is to place the tread design insert 29 into the mold in the position shown in FIGS. 1 and 3. The tread design inserts 29 can be used over and over again.

Figure 2:
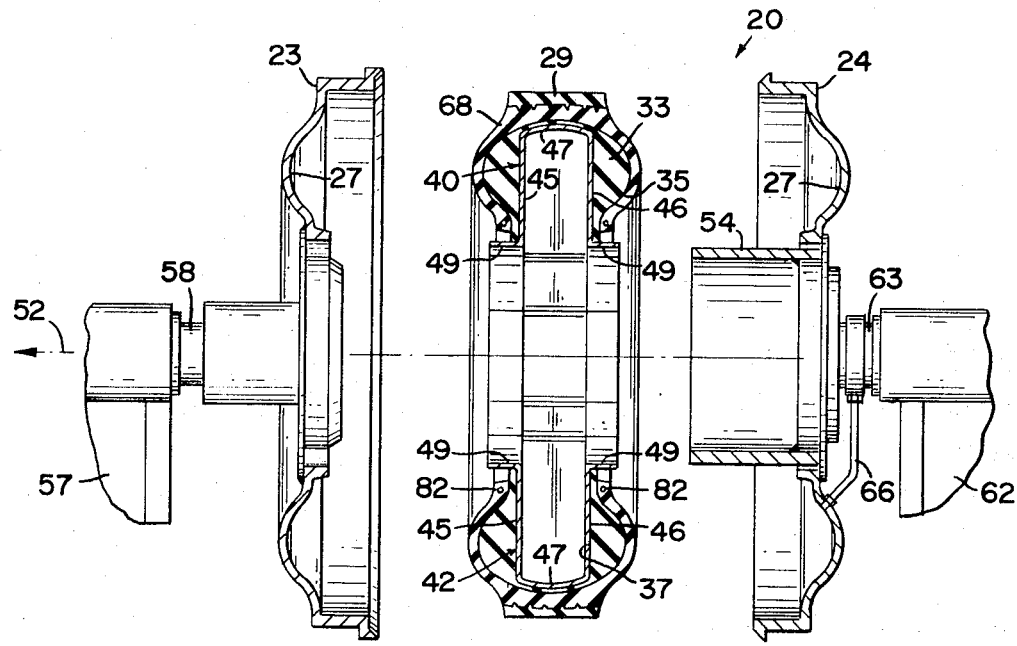
FIG. 2 is an elevational view showing some of the parts of FIG. 1 separated.

A core assembly is provided for cooperation with the outer mold part 22 and is for the purpose of defining the inner shape of the tire which is to be formed in the centrifugal casting process. This design enables the core assembly to be economically constructed and easily assembled and disassembled. In this respect the core assembly comprises what will be referred to as a generally ringlike rubber or elastic member 33 sometimes referred to herein as a bag, which has an outer circumferentially extending surface 35 which, in the extended condition of the bag or elastic member 33, is spaced from the inner surface 27 of the outer mold part in a manner so as to define the cross section of the dire 68 to be formed. The elastic bag member 33 also has an inner circumferentially extending surface 37 which in cross section is generally rectangular in shape as best seen in FIGS. 1 and 2, with the radially inwardly side of the rectangular shape being open. This particular construction of the elastic bag member 33 permits it to be firmly supported during casting of the tire and yet permits it to be readily collapsed (See FIG. 5) for removal from the finished tire.

In order to support the elastic bag member 33 in its extended position during the tire forming process, a plurality of metal form members are provided, five of which are indicated by the reference numeral 40 in FIG. 3, two of which are indicated by the reference numeral 41, and one of which is indicated by the reference numeral 42. As seen in FIG. 3, these form members reside in the circumferentially extending inner surface 37 of the elastic bag member and form what may be referred to generally as a ringlike shape with each of the form members forming a sector of the ringlike shape. Each of the form members, even though some differ precisely in shape from the others, are provided with first and second sidewalls 45 and 46, respectively, and an outer peripheral wall 47 which engage the sides of the rectangular shape of the inner surface 37. The inner radial ends of the form members are provided with what has been referred to as flange wall means 49. The configuration of each of the form members is such that the complete ringlike shape is provided so as to hold the elastic bag member in its extended condition. The metal form members 40, 41 and 42 could number five and still be functional or they could number more than are shown.

Secured to the second mold half 24 is what has been referred to as a cylindrical or annular support 54 and in the assembled condition (FIG. 1) the flange wall means 49 of each of the form members engage the outer surface of the cylindrical support 54 so as to prevent radial inward movement of the form members. The form members are also preferably attached to the support as will be discussed in conjunction with FIG. 6 to prevent centrifugal force from pulling the form members outwardly. It will be noted specifically that the form member 42 is in effect, the keystone of the assembly of the form members. In disassembly the cylindrical support 54 must first be removed and thereafter form member 42 can be pulled radially inwardly and removed and thereafter all of the other forms can be disassembled.

The conventional material of construction for the centrifugal casting of a vehicle tire with this mold is a polyurethane and in order to provide for the introduction of polyurethane in its flowable form to the mold cavity, there has been provided a conduit 66 which permits the introduction of material with rotation of the mold. It will be appreciated by those skilled in the art that materials other than a polyurethane may be used.

Figure 4:
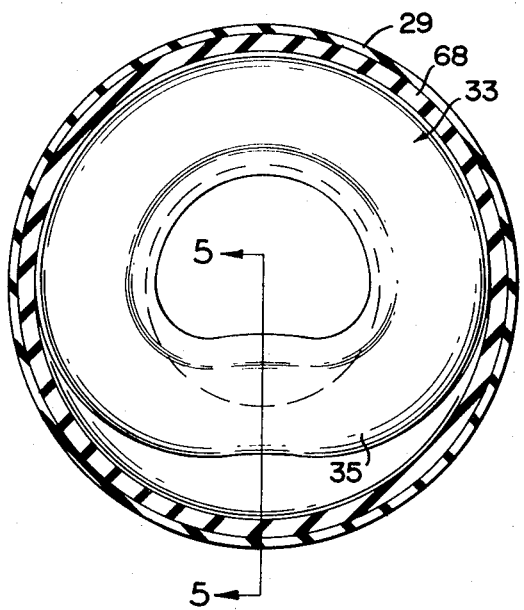
FIG. 4 is a view similar to FIG. 3 but showing the initial removal of the elastic inner core part of the mold.
Figure 5:
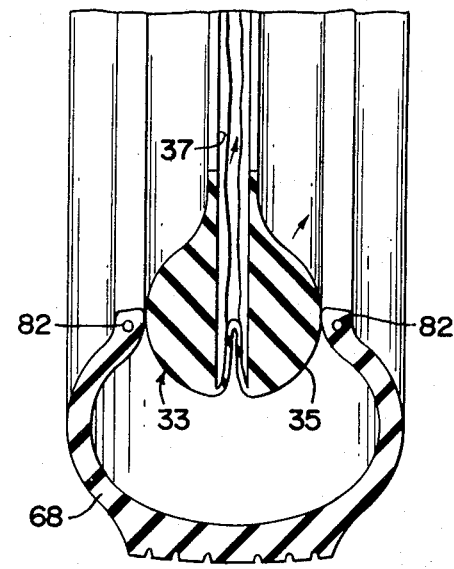
FIG. 5 is an enlarged view taken generally along the line 5—5 of FIG. 4 and showing axial collapsing of the inner core part and radial removal of same from the completed tire.

The operation of the structure of the present invention is as follows. Assume for the sake of example that a polyurethane tire 68 has been completed as shown in FIG. 1. The next step involved is to separate the first and second mold halves 23 and 24 as shown in FIG. 2, which also removes the cylindrical support 54. The form members are then removed from the inner surface of the elastic bag member by first moving form member 42 radially inwardly and then axially out of the tire opening. After this, all of the remaining form members can be conveniently removed. After the form members have been removed, the unsupported cross section of the elastic bag member can be distorted or deformed as shown in FIG. 5 and can be pulled from the confines of the cross section of the tire 68 as indicated in FIGS. 4 and 5. After this, the tread design insert 29 can be readily stripped from the tread of the tire and may be conveniently reused. In order to ready the apparatus for the production of another tire, it is then necessary to again extend the elastic bag member by replacing the form members into the bag member as shown in FIG. 3 with form member 42 being the last form member to be placed in position. The assembled elastic bag member can then be placed on the cylindrical support 54 with the flange wall means 59 engaging the same. The tread design insert 29 as well as beads 82 are then placed in the positions shown in FIG. 1 and the first and second mold halves 23 and 24 are then brought axially back together again. The mold is then rotated and the flowable polyurethane material is introduced through conduit 66 into the assembled mold. When the tire is completed the disassembly procedure set forth above is again carried out. The polyurethane may more preferably be introduced at a point which is radially inward of the beads 82 which permits trimming of the excess material at the bead toe rather than part way up the sidewall.

Figure 6:
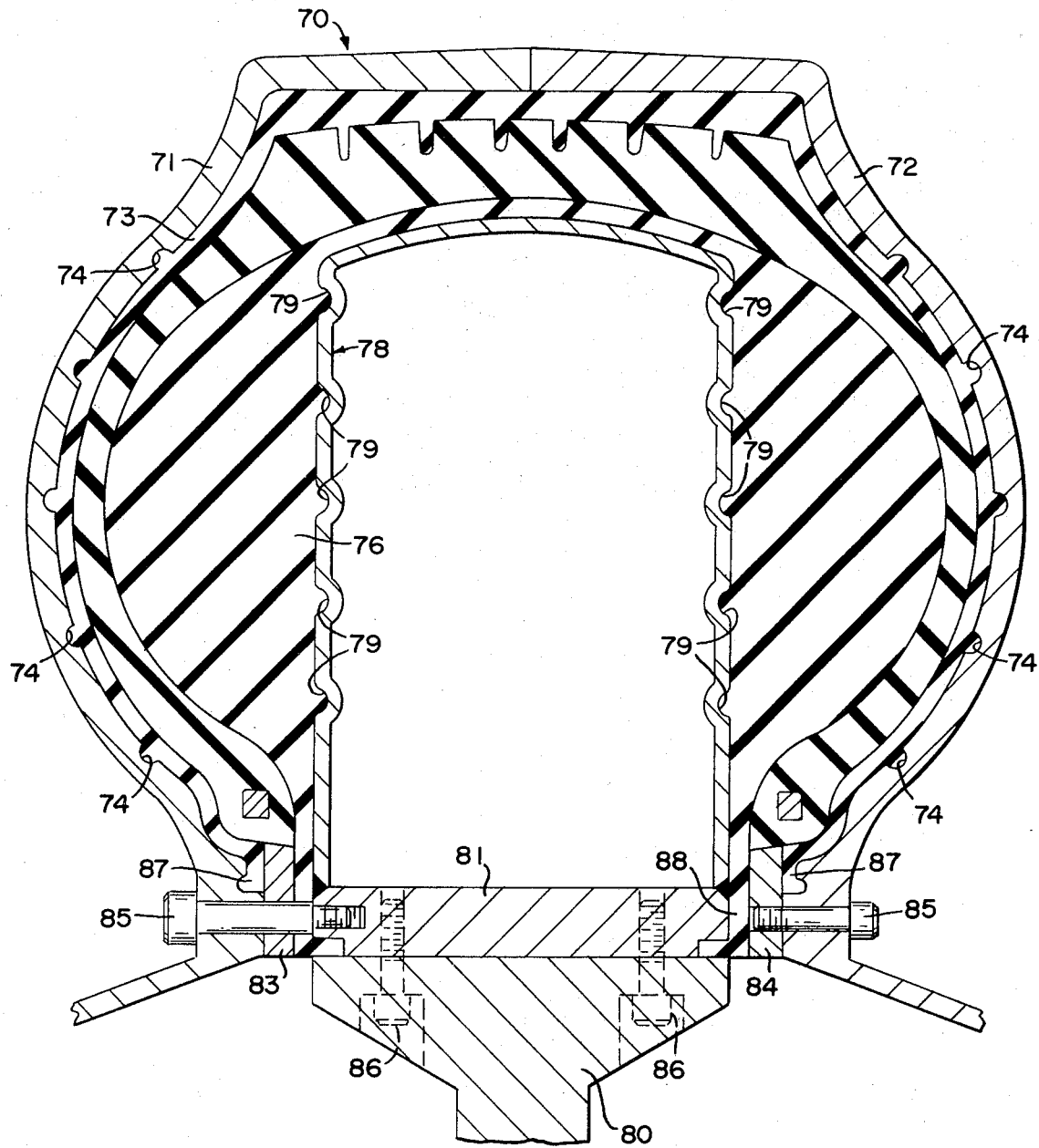
FIG. 6 is an enlarged cross-sectional view of modified form of the mold of the present invention.

FIG. 6 shows a modified form of the mold of the present invention and shows in detail the securing of the bag and form members as well as the insert. In this embodiment, the mold has been indicated generally by the reference numeral 70 and includes first and second mold halves 71 and 72. It will be appreciated that these mold halves may be mounted for rotation as in FIGS. 1 and 2 and it will also be appreciated that they might be mounted for rotation from only one side as distinguished from two. The inner surface of the mold 70 is provided with a plurality of grooves 74 which are adapted to receive correspondingly contoured surfaces on a tread design insert 73. The tread design insert 73 differs from the insert 29 shown in FIGS. 1 and 2 in that the insert 73 covers not only the tread area, but extends all the way down over the sidewalls to the bead areas of the tire.

Positioned within the confines of the mold 70 is an elastic bag member 76 which is essentially of the same construction as that shown in FIGS. 1 and 2. A form member 78 resides within the elastic bag member 76 to keep it in an extended condition and as will be noted, the form member has a plurality of grooves 79 on the outer surface thereof within which fit correspondingly contoured portions of the elastic bag member 76. The grooves 79 and the grooves 74 assist in holding the elastic bag member and tread design insert in position upon rotation of the mold 70 during the casting process. The form member 78 includes an end wall 81 and the entire assembly is secured to an annular support 80 by means of bolts 85 and 86 as shown. It will be noted that the lip 87 of the tread design insert 73 is held in position at opposed sides by means of first and second annular plates 83 and 84. The lip 88 of the elastic bag member 76 is held in position between the first and second annular plates and the end wall 81.

The casting process with this mold is carried out in essentially the same manner as described in conjunction with FIGS. 1 through 5 and the mold is disassembled in essentially the same manner. In referring to FIG. 6, the mold can be disassembled and the completed tire removed by loosening the bolts 85 at the right side of the construction and separating the second mold half 72. Bolts 86 and the bolts 85 at the left side of the construction can then be removed allowing the completed tire, bag member, form members and insert to be axially removed from the annular support 80. The individual form members 78 can then be removed from the interior of the elastic bag member 76. The elastic bag member can then be removed from the interior of the completed tire in a manner similar to that shown in FIG. 5 and the tread design insert 73 can be removed from the exterior of the tire.

It will therefore be apparent the structure of the present invention provides the definite advantage in that the expensive procedure of engraving the tread design in the steel or aluminum shell of the mold can be dispersed with. It will also be noted that the core comprised of the rubber or elastic bag member and the form members provides a construction which can be economically mass produced and is conveniently assembled and disassembled.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention, as hereinafter claimed.

I claim:

1. A mold for the centrifugal casting of tires including in combination an outer mold part having an inner circumferentially extending surface which defines the outer shape of a tire which has a first and second bead areas, a core assembly comprising a solid ring-shaped noninflatable elastic member having inner and outer peripheries, a continuous circumferentially extending outer surface which defines the inner shape of a tire extending between said outer and inner peripheries, said outer surface being spaced from said outer mold part, a continuous circumferentially extending inner surface extending from said inner periphery into the interior of said ring-shaped noninflatable elastic member to define a continuous annular opening into said interior and to define a cross section which permits collapsing of said elastic member from an extended position for removal from a finished tire, said cross section comprising first and second side portions which in the extended position of said elastic member have a width dimension in an axial direction of a tire which is greater than the distance between the first and second bead areas so that said elastic member cannot be radially removed from a tire, said cross section including a connecting portion connecting said first and second side portions together and being thinner than said first and second side portions to permit said collapsing, a plurality of form members each having a cross section like said cross section of said elastic member and residing in and directly engaging said circumferentially extending inner surface of said noninflatable elastic member to hold said noninflatable elastic member in extended position, each of said form members having a width dimension in an axial direction of a tire which is less than the distance between the first and second bead areas so that said form members may be radially removed without substantially disturbing the first and second bead areas of a tire, said first and second side portions of said elastic member extending radially inwardly a distance to position the same between said form members and the first and second bead areas, the means for holding said form members in position.

2. A mold as claimed in claim 1, wherein said cross section of said elastic member is rectangular in shape in extended position with an open side and said form members having a cross section to match.

3. A mold as claimed in claim 1, wherein a removable elastic tread design insert is provided on said inner circumferentially extending surface of said outer mold part which insert carries the design of the tread on the inner surface thereof.

4. A mold as claimed in claim 1, wherein said form members in assembled condition form an annular ring member having an inner peripheral portion, an annular support member, means connecting said inner peripheral portion of said annular ring member to said annular support member to hold said form members in position.

* * * * *

UNITED STATES PATENT OFFICE
CERTIFICATE OF CORRECTION

PO-1050 (5/69)

Patent No. 3,645,655    Dated February 29, 1972

Inventor(s) Heinz Wilhelm Beneze

It is certified that error appears in the above-identified patent and that said Letters Patent are hereby corrected as shown below:

Col. 1, line 6, "core" should read --inner core--

Col. 2, line 13, "dire" should read --tire--

Col. 4, line 4, "dispersed" should read --dispensed--

Col. 4, line 20, delete "a" after "has"

Signed and sealed this 28th day of November 1972.

(SEAL)
Attest:

EDWARD M. FLETCHER, JR.
Attesting Officer

ROBERT GOTTSCHALK
Commissioner of Patents